April 18, 1939.  C. A. FORSSELL  2,154,674
POWER BONDS
Filed March 20, 1936
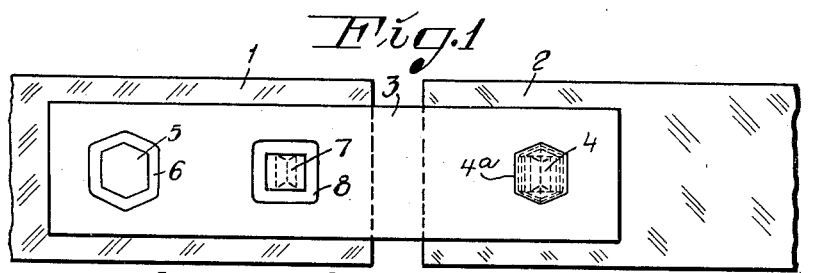
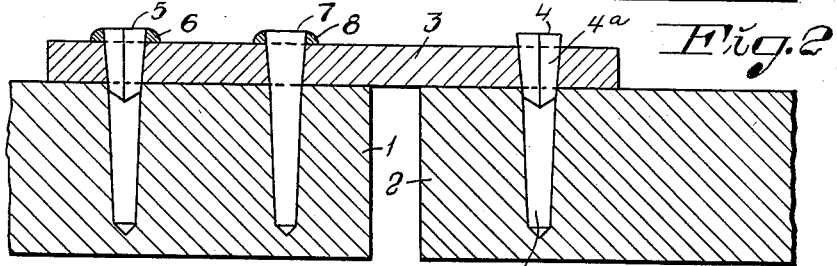
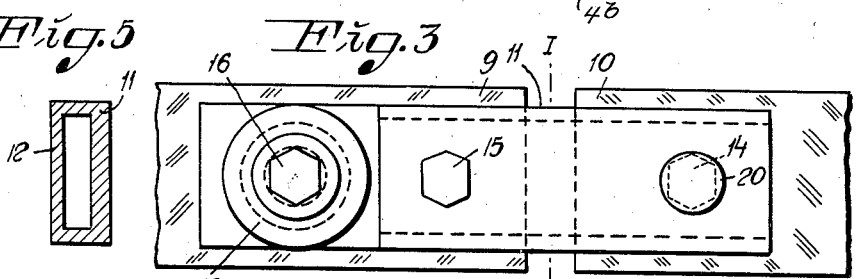
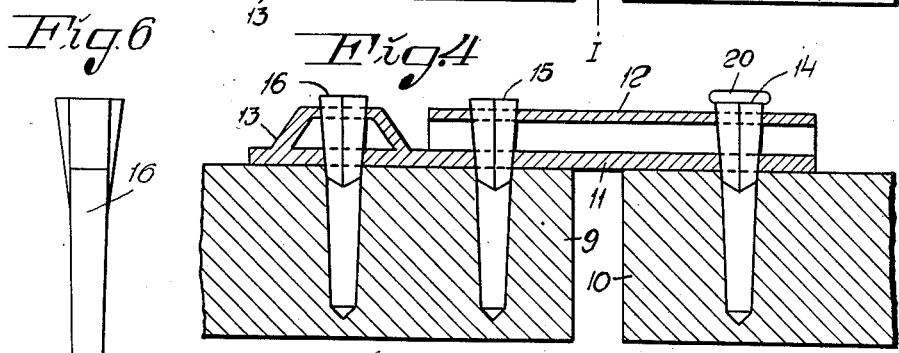
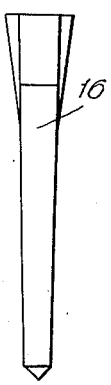
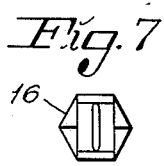
Inventor:
Carl Abraham Forssell,
By Potter, Pierce & Scheffler,
Attorneys.

Patented Apr. 18, 1939

2,154,674

UNITED STATES PATENT OFFICE 2,154,674

POWER BOND

Carl Abraham Forssell, Stockholm, Sweden

Application March 20, 1936, Serial No. 69,963
In Sweden March 23, 1935

11 Claims. (Cl. 20—92)

The present invention relates to a power-bond between a mounting, furniture, or strap of iron or other metal and wood or the like which power-bond comprises spikes or nails forced into the wood through holes in the mounting, furniture or strap (hereinafter referred to as the furniture).

The main object of the invention is to provide bonds of the kind referred to, in which the spikes are bending-resistibly joined with the furniture.

The simplest way of effecting the bending-resistant bond according to the invention is to force the spike or nail or the head thereof through a hole in the mounting, furniture or strap by means of power. The head or shank of the spike or nail may have a form differing from that of the hole so as to cause a deformation of any kind of the spike or of the material in the furniture. According to essential features of the invention the tapering, conical, wedge-shaped, cylindrical, or square spike or spike head is forced through a tapering, conical, wedge-shaped, cylindrical or square hole in the furniture. If both the spike head and the hole in the furniture are conical or wedge-shaped, they may have different top angles.

According to another feature of the invention the spike or spike head or the hole of the furniture or both have longitudinal grooves or ribs adapted to serve the clamping of the spike or spike head in the furniture. Such longitudinal grooves or ribs may be present on a cylindrical or otherwise shaped spike head forced by power in a cylindrical or conical hole of the furniture of iron. The head may have the same or a greater cross-sectional size than the adjacent portion of the spike shank.

According to a further feature of the invention the bending-resistant bond between the spike and the furniture may be obtained by a welding joint applied therebetween after the spike has been forced into the hole. Such a welding joint may also be present at the same time as a device referred to above and adapted to effect a bending-resistant bond between the spike and the furniture of iron.

According to a still further feature of the invention the bending-resistant bond may be strengthened by assembling the furniture, at least at the spike hole, from two layers spaced apart, in which case the spike engages both of said layers at the same time. Such a simultaneous engagement of the spike with both layers may be obtained by forcing the spike or its head by power through either or both of the layers.

Two embodiments of the invention are illustrated by way of example in the accompanying drawing, in which Figure 1 is a plan view and Fig. 2 a longitudinal section of a device according to the invention, Figs. 3 and 4 are a plan view and a longitudinal section respectively of a modified form of the invention, Fig. 5 is a cross-sectional view along line I—I of Fig. 3, and Figs. 6 and 7 represent a side elevational view and a bottom plan view, respectively, of the form of spike seen, for example, at the left hand end of Fig. 4 in front elevation.

Referring to Figs. 1 and 2 the reference numerals 1 and 2 indicate wood elements connected by means of the iron strap 3 which is connected to the wood element 2 by means of a spike or nail 4 having a wedge-shaped head 4$^a$ and a shank 4$^b$. The strap 3 is connected to the wood-element 1 by means of the spikes 5 and 7. These spikes are of the same kind as the spike 4 but in distinction therefrom they have a welding joint 6 and 8 respectively between the spike head and the strap.

In Figs. 3–5 the wood elements 9 and 10 are connected by means of an iron strap 11. This strap has on a part of its length a double layer 12 parallel to the iron strap 11 and connected thereto by longitudinal lateral edge portions. At the remaining part of its length the strap 11 has a double layer in the form of a blunt cone 13. The spikes 14 and 15 are forced through holes in the strap 11 and in the double layers 12, and engage both of them by their wedge-shaped heads. The spike 16 is forced through holes in the strap 11 and the cone 13 in the same way, having engagement between the wedge-shaped head and both of the cone layers. The spikes may have an additional strike-head 20 formed integral with the ordinary head as shown at spike 14 in Figs. 3 and 4.

It is to be noted that the spikes 5 and 7 in Fig. 1 and the spikes 14, 15 and 16 in Fig. 3 are shown by indicating their top only in the view in question, and that all of the spikes in the various embodiments comprise, like the spike 4, a head and an integral shank.

By constructing the spike bond as described and shown in the drawing the advantage is obtained that the effective line of the force transmitted by the spike from the wood element to the iron furniture need not be directed—as in an ordinary bond of said type—through that surface of the spike abutting against the furniture but is displaced to the interior of the wood element. This follows since the bending moment at that section of the spike which abuts the iron strap results in the production of a lever arm for the shearing force at said section, causing said shearing force to act as if displaced to the interior of the wood element. Therefore, the pressure per unit of surface in the hole-edge between the spike and the wood is a minimum, and as a result the joint will have a maximum of weight carrying capacity for a predetermined spike.

Tests using 6" spikes having a shank as an ordinary 6" oak-spike but having a wedge-shaped head of a suitable form and a wedge-angle of about 10° have resulted in a weight carrying capacity per spike of up to 1800 kg. forcing the spikes into cylindrical holes made in a furniture plate of 6 mm. thickness. Up to about ⅓ of said load the movements between the wood and the furniture-iron were very small. As a result of parallel tests using similar spikes, the head of which was to full strength welded to a similar furniture-plate the movements as well as break loads were substantially the same for both of them. The provision of a wedge-shaped square spike-head in a cylindrical hole in the furniture-plate thus utilizes the spike completely and causes no materially greater cost than an ordinary oak-spike.

Though the invention is referred to above in connection with a bond between furniture of iron and a wooden element, it is self-evident that it may also be applied to bonds between elements of other material such as furniture of other metal on one hand and elements of hardly pressed fibrous material or the like on the other hand.

What I claim is:

1. A connection of the type stated comprising an element of wood or the like; a piece of metal furniture having holes therethrough; and spikes, having head portions at least parts of which are of greater width than corresponding parts of said holes, forced through said holes and into said element; said spikes being united to said furniture by deformation of the metal thereof due to the forcing of said head portions into the furniture.

2. A connection as claimed in claim 1, wherein said spikes have cross-sections differing from those of the corresponding holes before the spikes are forced into the same.

3. A connection as claimed in claim 1 wherein the portions of said spikes within said holes have cross-sections differing from the initial cross-sections of the corresponding holes.

4. A connection of the type stated comprising an element of wood or the like, a piece of metal furniture having holes therethrough, and spikes forced through said holes and into said element, said spikes having outer end portions differing in cross-section from the initial cross-sections of the holes in said furniture, whereby the metal of said furniture is deformed as the spikes are forced therethrough.

5. A connection as claimed in claim 4, wherein the cross-section of the end portions of said spikes differs in shape from the initial cross-sections of the corresponding holes.

6. A connection as claimed in claim 4, wherein said holes are initially of circular cross-section, and the ends of said spikes have a polygonal cross-section.

7. A connection as claimed in claim 4, wherein said outer end portions of the spikes taper with respect to the corresponding holes in said furniture.

8. A connection as claimed in claim 4, wherein said outer end portions of the spikes have a transverse width not less than that of the inner end portions that enter said element.

9. A connection as claimed in claim 4, in combination with welds between said furniture and the spikes.

10. A connection as claimed in claim 4, wherein said furniture comprises a piece of member having spaced sections through which alined pairs of holes extend to receive the spikes.

11. A connection of the type stated comprising an element of wood or the like, a metal strap having holes therethrough, and spikes forced through said holes and into said element, said spikes having outer heads tapering outwardly at an angle in excess of that of said holes, whereby the metal of the spike heads and of the strap is deformed to form a bending-resistant bond between the spikes and the strap when said spikes are forced into said holes of the strap.

CARL ABRAHAM FORSSELL.

CERTIFICATE OF CORRECTION.

Patent No. 2,154,674.

April 18, 1939.

CARL ABRAHAM FORSSELL.

It is hereby certified that error appears in the printed specification of the above numbered patent requiring correction as follows: Page 2, second column, line 36, claim 10, for "furniture comprises a piece of member" read piece of furniture comprises a member; and that the said Letters Patent should be read with this correction therein that the same may conform to the record of the case in the Patent Office.

Signed and sealed this 16th day of May, A. D. 1939.

(Seal)

Henry Van Arsdale
Acting Commissioner of Patents.